(12) United States Patent
Wang et al.

(10) Patent No.: US 12,347,037 B2
(45) Date of Patent: Jul. 1, 2025

(54) SUPPORTING AN AUGMENTED-REALITY SOFTWARE APPLICATION

(71) Applicant: Telefonaktiebolaget LM Ericsson (publ), Stockholm (SE)

(72) Inventors: Yu Wang, Solna (SE); Sandra Bäckström, Stockholm (SE); Johan Haraldson, Stockholm (SE); Jaeseong Jeong, Solna (SE); Matthew John Lawrenson, Bussigny (CH)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 508 days.

(21) Appl. No.: 16/338,868

(22) PCT Filed: Nov. 11, 2016

(86) PCT No.: PCT/EP2016/077453
§ 371 (c)(1),
(2) Date: Apr. 2, 2019

(87) PCT Pub. No.: WO2018/086704
PCT Pub. Date: May 17, 2018

(65) Prior Publication Data
US 2021/0287440 A1    Sep. 16, 2021

(51) Int. Cl.
*G06T 19/00* (2011.01)
*G06F 3/01* (2006.01)
(52) U.S. Cl.
CPC ............ *G06T 19/006* (2013.01); *G06F 3/011* (2013.01)
(58) Field of Classification Search
CPC .............................. G06T 19/006; G06F 3/011
See application file for complete search history.

(56) References Cited

U.S. PATENT DOCUMENTS 7,720,436 B2     5/2010  Hamynen et al.
9,495,801 B2 *  11/2016  Ebstyne ................ G06T 19/006
(Continued)

FOREIGN PATENT DOCUMENTS

CO       07132122         3/2009
EP       1986457 A1 * 10/2008 ............ H04W 4/029
(Continued)

OTHER PUBLICATIONS

Russian Office Action mailed Feb. 7, 2020 for Russian Patent Application No. 2019117952/08(034355) (English translation included), 4 pages.
(Continued)

*Primary Examiner* — Chante E Harrison
(74) *Attorney, Agent, or Firm* — Sage Patent Group

(57) ABSTRACT

A computing device for supporting an Augmented-Reality (AR) software application is provided. The computing device is operative to select a physical location for placing a current virtual object, where the current virtual object appears to be placed when overlaid onto a video sequence capturing a physical scene in the surroundings of a user, based on an expected physical location which the user assumes in response to displaying the physical scene and the overlaid current virtual object to the user, and an attribute which is spatially dependent and which has an impact on a user experience of the AR software application. Taking the spatially-dependent attribute at the expected physical location of the user into consideration in selecting physical locations for placing virtual objects is advantageous in that virtual objects may be deployed at physical locations so as to provide an improved, or at least satisfactory, user experience to the users.

22 Claims, 6 Drawing Sheets

(56) References Cited

U.S. PATENT DOCUMENTS

| | | | | |
|---|---|---|---|---|
| 9,782,668 | B1* | 10/2017 | Golden | A63F 13/216 |
| 10,943,395 | B1* | 3/2021 | Green | G06F 3/04847 |
| 11,609,426 | B2* | 3/2023 | Wieczorek | G02B 27/017 |
| 2010/0265164 | A1* | 10/2010 | Okuno | H04S 7/304 |
| | | | | 345/8 |
| 2012/0047466 | A1* | 2/2012 | Noda | G06F 3/011 |
| | | | | 715/848 |
| 2012/0100911 | A1 | 4/2012 | Rejen | |
| 2012/0122570 | A1* | 5/2012 | Baronoff | A63F 13/792 |
| | | | | 463/31 |
| 2012/0249741 | A1 | 10/2012 | Maciocci et al. | |
| 2013/0328927 | A1 | 12/2013 | Mount et al. | |
| 2014/0129342 | A1* | 5/2014 | Sanghavi | G06Q 30/0277 |
| | | | | 705/14.69 |
| 2014/0164637 | A1* | 6/2014 | Vukich | H04L 65/611 |
| | | | | 709/231 |
| 2014/0176591 | A1* | 6/2014 | Klein | G09G 5/026 |
| | | | | 345/589 |
| 2014/0300636 | A1* | 10/2014 | Miyazaya | H04R 5/033 |
| | | | | 345/633 |
| 2015/0156803 | A1* | 6/2015 | Ballard | G06F 3/0485 |
| | | | | 455/422.1 |
| 2015/0221133 | A1 | 8/2015 | Groten et al. | |
| 2015/0302643 | A1 | 10/2015 | Miller | |
| 2016/0085305 | A1* | 3/2016 | Spio | G06F 3/011 |
| | | | | 381/74 |
| 2016/0109940 | A1 | 4/2016 | Lyren et al. | |
| 2017/0205903 | A1* | 7/2017 | Miller | G06T 19/006 |
| 2017/0236332 | A1* | 8/2017 | Kipman | G06T 19/006 |
| | | | | 345/633 |
| 2018/0045963 | A1* | 2/2018 | Hoover | G02B 27/0172 |
| 2018/0284882 | A1* | 10/2018 | Shipes | G06F 3/012 |
| 2019/0329129 | A1* | 10/2019 | Fajt | A63F 13/57 |
| 2020/0074743 | A1* | 3/2020 | Zheng | G06T 7/73 |
| 2020/0090407 | A1* | 3/2020 | Miranda | G02B 27/0093 |
| 2021/0223858 | A1* | 7/2021 | Barak | G02B 27/01 |

FOREIGN PATENT DOCUMENTS

| | | | | |
|---|---|---|---|---|
| EP | 3500908 A1 * | 6/2019 | | G06F 3/005 |
| RU | 2417437 C2 | 4/2011 | | |
| RU | 2011116066 A | 10/2012 | | |
| WO | WO 2007/010411 A3 | 1/2007 | | |
| WO | WO 2013/154476 A1 | 10/2013 | | |

OTHER PUBLICATIONS

Colombian Office Action dated Sep. 10, 2021 for Colombian Patent Application No. NC2019/0003467, 12 pages.
International Search Report and Written Opinion of the International Searching Authority, PCT/EP2016/077453, mailed Jul. 5, 2017, 10 pages.
Second Written Opinion of the International Preliminary Examining Authority, PCT/EP2016/077453, mailed Nov. 22, 2017, 6 pages.
International Preliminary Report on Patentability of the International Preliminary Examining Authority, PCT/EP2016/077453, mailed Jun. 14, 2018, 19 pages.
Corrected International Preliminary Report on Patentability of the International Preliminary Examining Authority, PCT/EP2016/077453, mailed Jan. 7, 2019, 19 pages.

* cited by examiner

SUPPORTING AN AUGMENTED-REALITY SOFTWARE APPLICATION

CROSS REFERENCE TO RELATED APPLICATIONS

This application is a 35 U.S.C. § 371 national stage application of PCT International Application No. PCT/EP2016/077453 filed on Nov. 11, 2016, the disclosure and content of which is incorporated by reference herein in its entirety.

TECHNICAL FIELD

The invention relates to a computing device for supporting an Augmented-Reality (AR) software application, a method of supporting an AR software application, a corresponding computer program, and a corresponding computer program product.

BACKGROUND

AR is a live direct or indirect view of a physical, real-world environment whose elements are augmented (or supplemented) by computer-generated sensory input such as sound, video, or graphics. It is related to a more general concept called mediated reality, in which a view of reality is modified (possibly even diminished rather than augmented) by a computer. Augmentation is conventionally performed in real-time and in semantic context with environmental objects. In addition, by utilizing object recognition, physical, real-world objects can be manipulated or taking into consideration in augmenting the real-world environment.

Typically, AR software applications utilize displays worn by a user for displaying an augmented scene of the user's surroundings, which is oftentimes captured by a camera worn by the user. In recent years, Head-Mounted Displays (HMDs), or Virtual-Reality (VR) headsets, have become increasingly popular for use with AR. These devices comprise one or more displays, and oftentimes also a camera, and are designed be paired to the user's forehead, like a harness or helmet. HMDs place images of both the physical world and virtual objects augmenting the physical world over the user's field of view. They oftentimes employ sensors for six degrees-of-freedom monitoring which allow the AR software application to correctly align virtual objects to the physical world in response to the user's movements. HMDs are commercially available, e.g., the Microsoft HoloLens and Oculus Rift. Also available are utilities for utilizing a smartphone as HMD, facilitating pairing of the smartphone with the user's forehead (e.g., Google Cardboard and Samsung Gear VR).

The number of AR software applications has increased significantly with the advent of commercially available HMDs. AR is, e.g., used in architecture for visualizing building projects, in commerce for visualizing a product to customers, and in gaming. As an example, the mobile gaming application Pokémon Go, which was released by Nintendo in July 2016, has quickly became a global success with hundreds of millions of downloads. Pokémon Go is a location-based AR game which deploys virtual objects in the form of pocket monsters to physical locations, and players have to move to the physical locations to capture the monsters.

Following the success of Pokémon Go, the number of location-based AR games and apps is expected to increase considerably. A common feature of location-based AR games and apps is that players, or users, are required to visit specific physical, i.e., real-world, locations for interacting with virtual objects which have been placed there. Since AR software applications typically communicate with application servers hosting the AR software application via Radio Access Networks (RANs), they put high demands on the RAN by generating a considerable network load. In particular, this is the case if a substantial number of AR users move into proximity of each other. Location-based AR games and apps may also suffer from bad connectivity if the user moves into a region of bad coverage, caused by, e.g., shadowing, interference, or the like. Both these issues have a negative impact on user experience of the AR software application.

SUMMARY

It is an object of the invention to provide an improved alternative to the above techniques and prior art.

More specifically, it is an object of the invention to provide improved solutions for selecting physical locations for placement of virtual objects by AR software applications.

These and other objects of the invention are achieved by means of different aspects of the invention, as defined by the independent claims. Embodiments of the invention are characterized by the dependent claims.

According to a first aspect of the invention, a computing device for supporting an AR software application is provided. The computing device comprises processing means operative to select a physical location for placing a current virtual object based on an expected physical location which a user of the AR software application assumes, and an attribute which is spatially dependent in the surroundings of the user. The spatially-dependent attribute has an impact on a user experience of the AR software application. The expected physical location is the physical location which the user assumes in response to displaying a video sequence capturing a physical scene in the surroundings of the user and the overlaid current virtual object to the user. The selected physical location is the physical location where the current virtual object appears to be placed when overlaid onto the video sequence capturing the physical scene in the surroundings of the user.

According to a second aspect of the invention, a method of supporting an AR software application is provided. The method is performed by a computing device and comprises selecting a physical location for placing a current virtual object based on an expected physical location which a user of the AR software application assumes, and an attribute which is spatially dependent in the surroundings of the user. The spatially-dependent attribute has an impact on a user experience of the AR software application. The expected physical location is the physical location which the user assumes in response to displaying a video sequence capturing a physical scene in the surroundings of the user and the overlaid current virtual object to the user. The selected physical location is the physical location where the current virtual object appears to be placed when overlaid onto the video sequence capturing the physical scene in the surroundings of the user.

According to a third aspect of the invention, a computer program is provided. The computer program comprises computer-executable instructions for causing a device to perform the method according to an embodiment of the second aspect of the invention, when the computer-executable instructions are executed on a processing unit comprised in the device.

According to a fourth aspect of the invention, a computer program product is provided. The computer program product comprises a computer-readable storage medium which has the computer program according to the third aspect of the invention embodied therein.

In the present context, the computing device for supporting an AR software application may, e.g., be embodied by an application server hosting the AR software application, an HMD or VR headset, a mobile phone, a smartphone, a mobile terminal, a personal computer, a laptop, a tablet, or a gaming console. The AR software application may, e.g., be an AR game, such as Pokémon Go, or an AR app for augmenting physical, real-world objects which information, such as an AR tourist guide. Throughout this disclosure, the terms "physical" and "real-world" are used interchangeably, and are to be understood as referring to an object or a location in the real-world. The surroundings of the user, and the captured scene which is augmented by overlaying virtual objects, may be any real-world indoor or outdoor location, e.g., a room or public space.

The invention makes use of an understanding that an improved selection of physical locations for placement, or deployment, of virtual objects by AR software applications may be achieved by taking a spatially-dependent attribute into consideration, which has an impact on a user experience of the AR software application. The spatially-dependent attribute changes as a function of physical location in the real-world, at least in the surroundings of the user. The spatially-dependent attribute may, e.g., be related to a performance of a wireless connection which is utilized by the AR software application, such as a signal strength, a data rate, a bandwidth, an error rate, a retransmission rate, and a latency, of the wireless connection. It will be appreciated that the user experience of the AR software application typically benefits from high signal-strength, high data-rate or bandwidth, low error-rate, low retransmission-rate, and low latency. The wireless connection may be a connection utilized by the AR software application for transmitting information pertaining to placement of virtual objects to a user device which renders the augmented scene for display to the user based on the received information. Alternatively, the wireless connection may be utilized for transmitting the rendered augmented scene, as a video stream, to a user device for displaying the augmented scene to the user. The wireless connection may, e.g., be effected via a cellular RAN, a Wireless Local Area Network (WLAN)/Wi-Fi network, Bluetooth, or the like.

Alternatively, the spatially-dependent attribute may be related to a perception by the user of sound which is rendered by the AR software application. In particular, this may be sound which is rendered by loudspeakers which are placed in the surroundings of the user. For instance, the user perception may relate to whether stereo audio or 3D audio can be delivered at a certain location which sufficient quality, which in turn has an impact on user experience of the AR software application.

The physical location for placing a current virtual object, i.e., a virtual object which the AR software application is about to deploy, is selected by evaluating the spatially-dependent attribute at the expected physical location which the user assumes in response to displaying the physical scene and the overlaid current virtual object to the user. This is the likely future location of the user, i.e., the user's location after the overlaid virtual object has been displayed to, and viewed by, the user. Notably, virtual objects may have the effect, when being displayed to users, to either retain a user in his/her current physical location or trigger a change of location. For instance, a user may wish to interact with a virtual object, e.g., for collecting an item from a "friendly" character in an AR game. In this case, the user is expected to move to a physical location close to the physical location where the current virtual object appears to be placed in the real world. On the other hand, a virtual object representing a "hostile" character in an AR game, i.e., a character which poses a threat to the user's game character, is likely to retain the user in his/her current physical location, or even initiate a change in physical location of the user so as to increase the distance to the physical location where the virtual object appears to be placed.

Taking the spatially-dependent attribute at the expected physical location of the user into consideration in selecting physical locations for placing virtual objects is advantageous in that virtual objects may be deployed at physical locations so as to provide an improved, or at least satisfactory, user experience to the users. To this end, the AR software application may avoid deploying virtual objects, which are known to trigger a change of the user's physical location towards the real-world location at which the virtual object appears to be placed, at physical locations which suffer from bad radio conditions or wireless connectivity, or at which sound which is rendered by the AR software application cannot be perceived with sufficient quality.

According to an embodiment of the invention, the physical location for placing the current virtual object is selected by considering at least one candidate physical location for placing the current virtual object. These candidate locations may, e.g., be acquired from the AR software application. Alternatively, the AR software application may request a physical location for placing a virtual object based on geographical boundaries and/or other information, e.g., a distance from the user and/or distances from other virtual objects or real-world objects. More specifically, for each of the at least one candidate physical location, the expected physical location which the user assumes is determined, and a value of the spatially-dependent attribute at that expected physical location is evaluated. The expected physical location which the user assumes is the location to which the users moves, or where the user remains, in response to displaying the physical scene and the current virtual object overlaid such that it appears to be placed at the candidate physical location, to the user. After the spatially-dependent attribute has been evaluated for the at least one candidate physical location, the physical location for placing the current virtual object is selected based on the plurality of values of the spatially-dependent attribute evaluated at the at least one candidate physical location.

According to an embodiment of the invention, the expected physical location which the user assumes in response to displaying the physical scene and the overlaid current virtual object to the user is within a predetermined range of the candidate physical location. In particular, the expected physical location may be close to, or equal to, the candidate physical location. This is advantageous in case the user is expected to move closer to the physical location where the current virtual object appears to be placed.

According to an embodiment of the invention, the expected physical location which the user assumes in response to displaying the physical scene and the overlaid current virtual object to the user may be determined based on a type of the current virtual object. For instance, the expected physical location may be determined based on information pertaining to an expected behavior of users of the AR software application in response to displaying a virtual object of the same type as the current virtual object to the users. As an example, in an AR game, virtual objects may be categorized into types such as "friendly", "neutral", and "hostile", according to an expectation that users are likely move closer to a virtual object, remain in their physical location, or move further away from a virtual object, respectively. Alternatively, the expected physical location which the user assumes in response to displaying the physical scene and the overlaid current virtual object to the user may be determined based on a learned behavior of the user in response to previously displayed virtual objects of the same type as the current virtual object. As an example, a user of an AR tourist guide may be expected to move closer to a real-world object such as a statue or a building, when augmented by information about the object (e.g., historical information or opening hours), if the user is known to have visited such objects previously.

According to an embodiment of the invention, one or more values of the spatially-dependent attribute may be retrieved from a database, as a function of a physical location in the surroundings of the user. The retrieved values may be measured values, e.g., values measured by the computing device when carried by the user, or values measured by other, similar computing devices (i.e., crowd-sourced). Alternatively, the retrieved values may be simulated values, e.g., calculated based on a model for radio coverage in the surroundings of the user.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings, and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
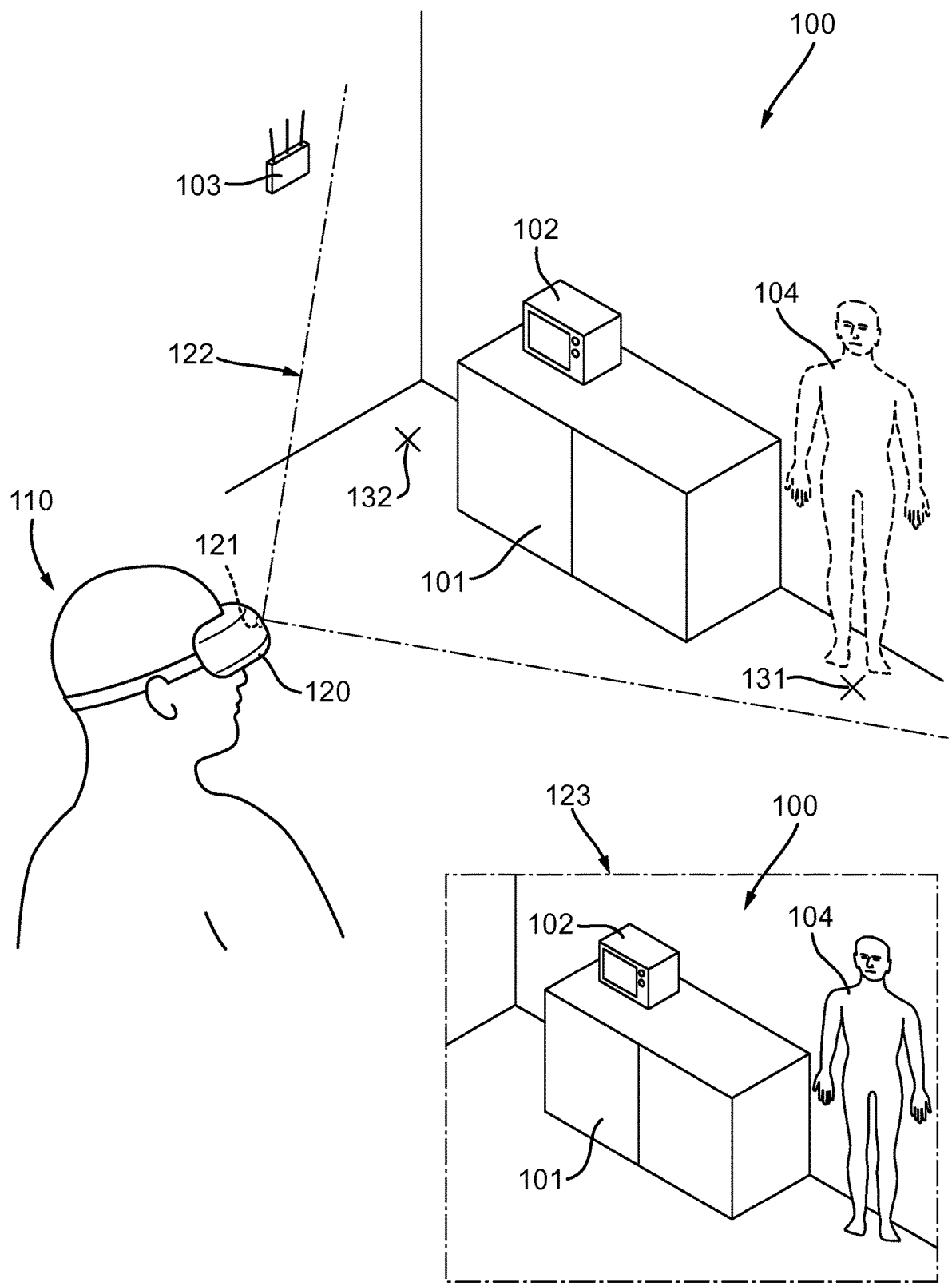
FIG. 1 illustrates a first scenario for selecting a physical location for placing a virtual object on behalf of an AR software application, in accordance with embodiments of the invention.

In FIG. 1, selecting a physical location for placing a virtual object on behalf of an AR software application is illustrated, using an embodiment 120 of the computing device for supporting an AR software application as an example. The AR software application may, e.g., be an AR gaming app, or any other type of AR app such as an AR tourist guide. The computing device for supporting an AR software application may, e.g., be embodied by an application server hosting the AR software application, an application server for selecting physical locations for placing virtual objects on request by the AR software application, an HMD or a VR headset, a mobile phone, a smartphone, a mobile terminal, a personal computer, a laptop, a tablet, or a gaming console.

Figure 4:
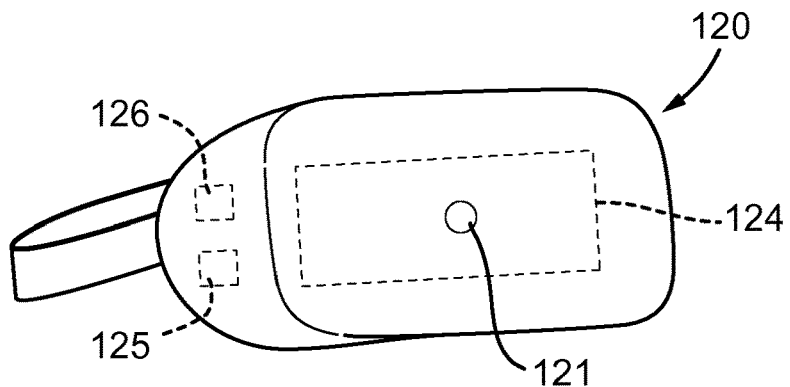
FIG. 4 shows a computing device for supporting an AR software application, in accordance with an embodiment of the invention.

In the following, embodiments of the invention are described with reference to FIG. 1, in which an embodiment 120 of the computing device for supporting an AR software application is illustrated as an HMD, or a VR headset, shown in further detail in FIG. 4. Computing device 120 comprises a camera 121 having a field-of-view 122, at least one display 124, processing means 125, and a communications module 126.

In the present context, placing a virtual object, or deploying a virtual object, is to be understood such that a graphical representation of the virtual object, e.g., a character in an AR game or information about a real-world object provided by an AR tourist guide, is overlaid onto a video sequence capturing a physical, real-world scene, such that the virtual object appears to be placed at a corresponding physical location in the physical scene. This is illustrated in FIG. 1, which shows an indoor physical scene 100 with an overlaid virtual object 104 placed at a physical location 131. In addition, the scene 123 which is rendered by the AR software application and presented to a user 110 of the AR software application, using display 121 which is integrated into computing device 120, is also illustrated.

Throughout this disclosure, it is assumed that user 110 may move throughout his/her surroundings, including physical scene 100. Depending on the type of virtual object 104 which is overlaid onto physical scene 100 and presented to user 110, user 110 may either move closer to physical location 131 where virtual object 104 is placed, remain in his/her current location, or move further away from virtual object 104. For instance, if virtual object 104 represents a "friendly" character in an AR game, user 110 may be expected to move closer to physical location 131 where virtual object 104 is placed in order to interact with virtual object 104, e.g., for collecting a valuable item such as a treasure. On the contrary, if virtual object 104 represents a "hostile" character, user 110 is likely to move further away from physical location 131 where virtual object 104 is placed, or maintain his/her current location.

To this end, processing means 125 is operative to select a physical location for placing a current virtual object, such as virtual object 104 placed at physical location 131 illustrated in FIG. 1. The selected physical location 131 is the physical location where current virtual object 104 appears to be placed when overlaid onto a video sequence capturing physical scene 100. Processing means 125 is operative to select physical location 131 based on an expected physical location which user 110 assumes in response to displaying physical scene 100 and overlaid current virtual object 104 to user 110, and an attribute which is spatially dependent in the surroundings of user 110. The spatially-dependent attribute has an impact on a user experience of the AR software application. Herein, the expected physical location which user 110 assumes is an estimated, likely future location of user 110, after overlaid current virtual object 104 has been displayed to user 110. This expected physical location of user 110 is taken into consideration in selecting a physical location for placing current virtual object 104, so as provide an improved, or at least satisfactory, user experience to the user of the AR software application.

The spatially-dependent attribute is a physical property on which the AR software application relies, and which has an impact on the user-experience of the AR software application. For instance, the spatially-dependent attribute may relate to performance of a wireless connection utilized by the AR software application. With reference to FIG. 1, the wireless connection may, e.g., be established between an Access Point 103 (AP) of a Wireless Local Area Network (WLAN)/Wi-Fi network and communications module 126 comprised in computing device 120. The spatially-dependent attribute may be any one of a signal strength, a data rate, a bandwidth, an error rate, a retransmission rate, and a latency, of the wireless connection. In particular, the user-experience of the AR software application typically benefits from high signal-strength, high data-rate, high bandwidth, low error-rate, low retransmission-rate, and low latency. As an alternative, the spatially-dependent attribute may relate to a perception by user 110 of sound which is rendered by the AR software application, e.g., by loudspeakers which are provided close to physical scene 100 (not illustrated in FIG. 1). In this case, the perception by user 110 may relate to whether stereo audio or 3D audio can be delivered at a certain physical location which sufficient quality, volume, or the like.

Further with reference to FIG. 1, an alternative physical location 132 for placing current virtual object 104 is shown. It will be appreciated that embodiments of the invention are not limited to considering two candidate physical locations for placing a current virtual object. Rather, the example presented here has been kept simple for the sake of simplicity. Similar to physical location 131, alternative physical location 132 is close to cupboard 101, and physical locations 131 and 132 may, e.g., have been selected based on a requirement of an AR game to find a physical location for placing current virtual object 104, here illustrated as a character of the AR game, such that the character can hide, e.g., in corner of a room or close to a piece of furniture, such as cupboard 101. However, in contrast to physical location 131, alternative physical location 132 is closer to microwave oven 102 which may cause interference in the wireless network created by AP 103. Accordingly, the performance of the wireless connection utilized by the AR software application, via communications module 126, is expected to be inferior at alternative physical location 132 as compared to physical location 131. The inferior performance is reflected by, and can be deduced from, a spatially-dependent attribute such as signal strength, data rate, bandwidth, error rate, retransmission rate, or a latency, of the wireless connection. To this end, physical location 131 for placing current virtual object 104 is selected from the two candidate physical locations 131 and 132 based on a superior performance of the wireless connection at physical location 131.

Figure 2:
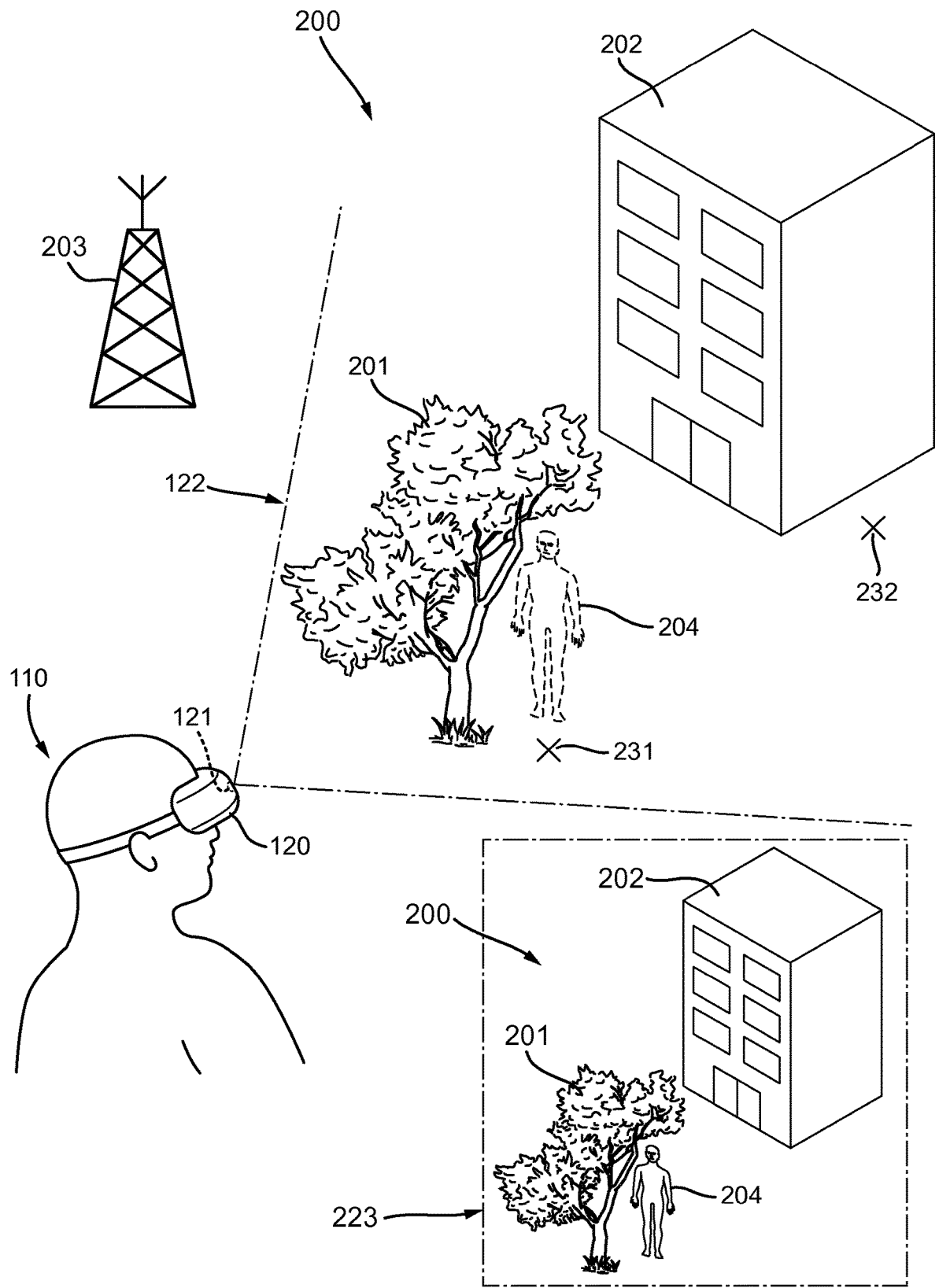
FIG. 2 illustrates a second scenario for selecting a physical location for placing a virtual object on behalf of an AR software application, in accordance with embodiments of the invention.

In FIG. 2, embodiments of the invention are illustrated in a different scenario. Here, an outdoor physical scene 200 is illustrated, which is captured by camera 121 comprised in computing device 120, again illustrated as an HMD or VR headset, worn by user 110. Similar to FIG. 1, processing means 125 is operative to select a physical location 231 for placing a current virtual object 204 based on an expected physical location which user 110 assumes in response to displaying the rendered augmented scene 223, comprising physical scene 200 and overlaid current virtual object 104, to user 110, and on a spatially-dependent attribute. Physical location 231 is the physical location where current virtual object 104 appears to be placed when overlaid onto the video sequence capturing physical scene 200. Similar to FIG. 1, the spatially-dependent attribute is in this example related to performance of a wireless connection utilized by the AR software application, and which has an impact on a user experience of the AR software application. In contrast to FIG. 1, the wireless connection is in FIG. 2 established between a Radio Base Station 203 (RBS) of a cellular communications network and communications module 126 comprised in computing device 120. The cellular communications network may, e.g., be any one of a Global System for Mobile communications (GSM) network, a Universal Mobile Telecommunications System (UMTS) network, a Long Term Evolution (LTE) network, or a 5G network.

In the scenario illustrated in FIG. 2, physical location 231 is selected for placing virtual object 104, rather than an alternative physical location 232, based on a superior performance of the wireless connection at physical location 231. This is due to the fact that alternative physical location 232 is behind a building 202 which negatively impacts the wireless connection between RBS 202 and communications module 126. It will be appreciated that embodiments of the invention are not limited to considering two candidate physical locations 231 and 232 for placing current virtual object 204.

In the following, selecting a physical location for placing current virtual object 104/204 is described in more detail, in accordance with embodiments of the invention. To this end, processing means 125 may be operative to select the physical location for placing current virtual object 104/204 from a set of candidate physical locations, the set comprising at least one candidate physical location, such as physical locations 131 and 132 illustrated in FIG. 1, or physical locations 231 and 232 illustrated in FIG. 2. The candidate physical locations may, e.g., be provided by the AR software application. For instance, a list of candidate physical locations may be provided by the AR software application together with a request for selecting a physical location for placing current virtual object 104/204. Alternatively, the AR software application may request a physical location for placing current virtual object 104/204 from computing device 120 based on geographical boundaries or other information provided by the AR software application. As an example, the AR software application may provide a distance or distances from user 110, real-world objects, and/or other virtual objects, or a geographical region within which the physical location for placing current virtual object 104 may be selected.

For each of the candidate physical locations, an expected physical location which user 110 assumes in response to displaying physical scene 100/200 and current virtual object 104/204 to user 110, such that current virtual object 104/204 appears to be placed at the current candidate physical location, is determined. Subsequently, a value of the spatially-dependent attribute is evaluated at the determined expected physical location of user 110. Advantageously, the user experience of the AR software application is thereby taken into consideration when a physical location for placing current virtual object 104/204 is selected. This may, e.g., be achieved by retrieving one or more values of the spatially-dependent attribute as a function of physical location in the surroundings of user 110 from a database, as is described further below. The values may, e.g., be retrieved for one candidate physical location at a time. Alternatively, a list or an array of values, or a map representing the spatially-dependent attribute, covering the surroundings of user 110 may be retrieved from the database. The retrieved values may be selected based on a physical location of device 120, previously placed virtual objects, a field-of-view 122 of a camera 121 worn by user 110, or the like. Finally, the physical location for placing current virtual object 104/204 is selected from the set of candidate physical locations based on the values of the spatially-dependent attribute evaluated at the at least one candidate physical location.

For instance, one of the candidate physical locations for which the spatially-dependent attribute evaluated at the corresponding expected physical location fulfils a predetermined criterion may be selected as the physical location for placing current virtual object 104/204. As an example, the selected physical location may be the first candidate physical location for which the spatially-dependent attribute evaluated at the candidate physical location fulfils the predetermined criterion. Preferably, the predetermined criterion relates to, or reflects, a user experience of the AR software application which is influenced by the spatially-dependent attribute. The predetermined criterion may, e.g., be a threshold criterion, such as exceeding a certain data rate or bandwidth, or not exceeding a certain latency or error rate, respectively.

As an alternative, the physical location for placing current virtual object 104/204 may be selected as the candidate physical location for which the evaluated spatially-dependent attribute assumes a maximum (e.g., data rate or bandwidth) or minimum value (e.g., error rate or latency).

As a further alternative, the physical location for placing current virtual object 104/204 may be selected by interpolating the plurality of values of the spatially-dependent attribute evaluated at a plurality of candidate physical location, and selecting a physical location where the interpolated value of the spatially-dependent attribute assumes an extreme value, e.g., a maximum in data rate or bandwidth, or a minimum in latency or error rate, respectively.

The candidate physical locations for which the spatially-dependent attribute is evaluated may optionally be determined in an adaptive manner. For instance, the next candidate physical location may be selected based on a trend which is identified in values of the spatially-dependent attribute evaluated for previous candidate physical locations. As an example, the next candidate physical location may be selected based on a direction in the surrounding is of user 110 in which the spatially-dependent attribute is expected, based on the identified trend, to increase, if the spatially-dependent attribute relates to a data rate or bandwidth of the wireless connection, or decrease, if the spatially-dependent attribute relates to an error rate or latency of the wireless connection, respectively. It will also be appreciated that the number of candidate physical locations which are evaluated may depend on a rate of change of the spatially-dependent attribute as a function of physical location in the surroundings of user 110. That is, if the spatially-dependent attribute is relatively constant in the surroundings of user 110, it suffices to evaluate fewer candidate physical locations as compared to a scenario in which the spatially-dependent attribute changes rapidly with physical location.

Processing means 125 may be operative to determine the expected physical location which user 110 assumes in response to displaying physical scene 100/200 and overlaid current virtual object 104/204 to user 110 by selecting the expected physical location to be within a predetermined range of the current candidate physical location, i.e., the candidate physical location which is under evaluation. In particular, for the purpose of evaluating the spatially-dependent attribute, the expected physical location of user 110 may be selected to be close to, or equal to, the candidate physical location. In particular, this is the case if current virtual object 104/204 is of a type which is likely to trigger a change of physical location of user 110 towards current virtual object 104/204 when overlaid onto physical scene 100/200.

Optionally, the expected physical location which user 110 assumes in response to displaying physical scene 100/200 and overlaid current virtual object 104/204 to user 110 is determined based on a type of current virtual object 104/204. For instance, in an AR game, possible virtual-object types for characters of the AR game may be "friendly", "hostile", "friend", "enemy", or the like. Preferably, virtual objects are categorized into different types which reflect a user's behavior to either move away from a virtual object, move closer to the virtual object, or to maintain his/her current physical location. For instance, the expected physical location which user 110 assumes in response to displaying physical scene 100/200 and overlaid current virtual object 104/204 to user 110 may be determined based on information pertaining to expected behavior of a group of users of the AR software application in response to displaying a virtual object of the same type as current virtual object 104 to the users. This information may, e.g., be provided by the AR software application. Alternatively, the expected physical location which user 110 assumes in response to displaying physical scene 100/200 and overlaid current virtual object 104/204 to user 110 is determined based on a learned behavior of user 110 in response to previously displayed virtual objects of the same type as current virtual object 104. That is, an embodiment of computing device 120 may learn how user 110 reacts to an overlaid virtual object of a certain type, i.e., whether user 110 increases, decreases, or maintains, his/her distance to the virtual object.

As is described hereinbefore, in evaluating values of the spatially-dependent attribute at an expected physical location which user 110 assumes in response to displaying current virtual object 104/204 placed at one of the candidate physical locations, one or more values of the spatially-dependent attribute may be retrieved from a database, either on a per-location basis, or by retrieving a list or an array of values, or a map representing the spatially-dependent attribute within a certain geographical region. In particular, this may be a region within the surroundings of user 110. These values may either be values measured by computing device 120 or other, similar computing devices, i.e., crowd-sourced. Alternatively, these values may be simulated values which are obtained using a model for radio coverage in the surroundings of user 110.

Optionally, processing means 125 may further be operative to store measured values of the spatially-dependent attribute as a function of physical location in the database. To this end, these values are measured by computing device 120 when worn by user 110. The measurements may be performed continuously, at regular intervals, or when the measured value has changed to a predetermined extent. The measured values are stored together with the physical location where they were measured, e.g., the physical location of computing device 120 during a measurement. The values may be stored for own use or for crowd-sourcing purposes, i.e., for use by other users of AR software applications.

Figure 3:
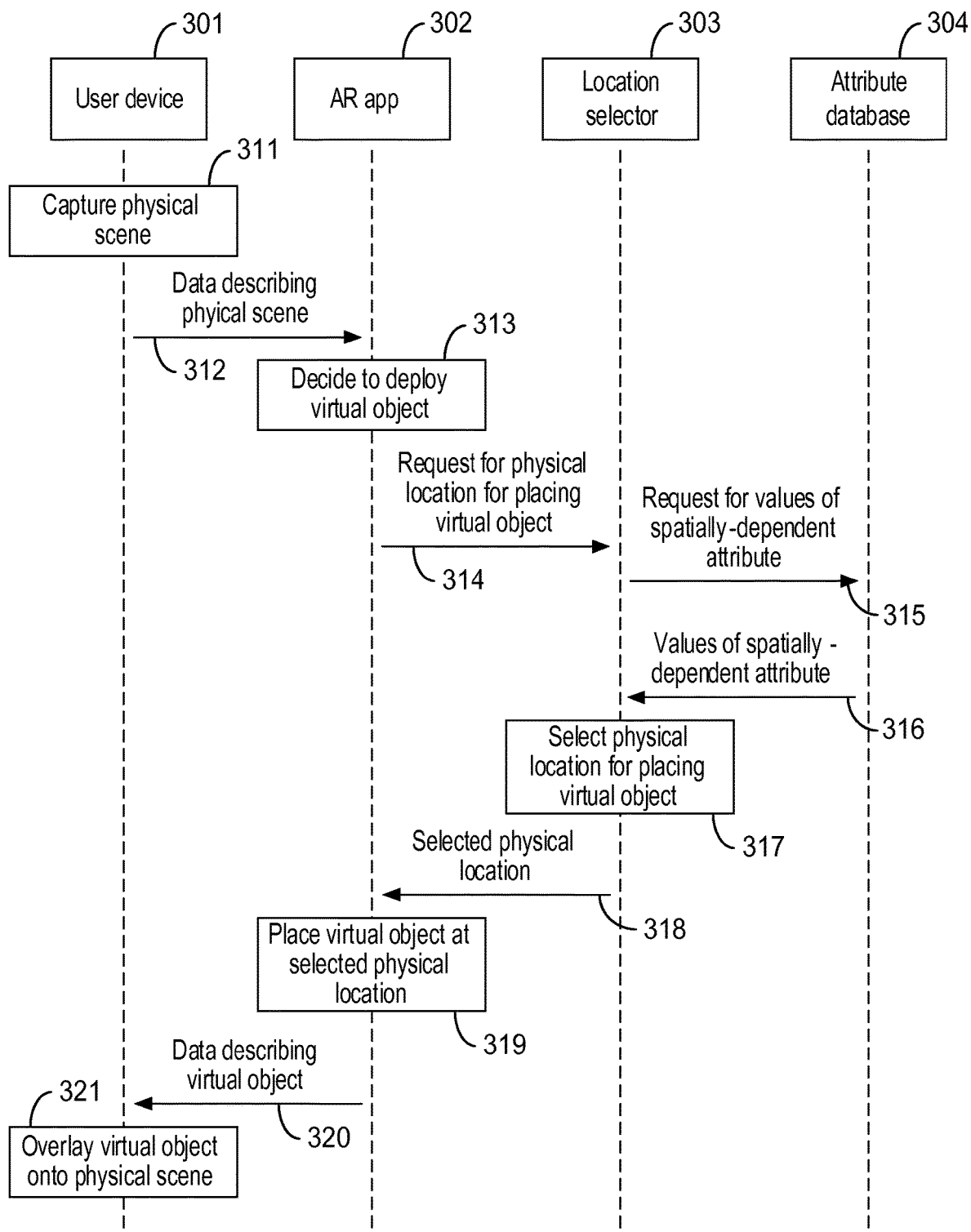
FIG. 3 illustrates the interaction between different roles of embodiments of the invention in selecting a physical location for placing a virtual object on behalf of an AR software application.

In the following, and with reference to FIG. 3, embodiments of the invention are described in terms of different roles and their mutual interaction.

The role of user device 301 is typically embodied by a device which is operated by a user of the AR software application, such as HMD 120 or VR headset 120 worn by user 110, a tablet, a mobile phone, a mobile terminal, a smartphone, or a gaming console. User device 301 typically comprises a camera 121 for capturing 311 physical scene 100/200 in the surroundings of user 110, and a display 124 for displaying the rendered view 123/223, i.e., the video sequence capturing physical scene 100/200 and overlaid current virtual object 104/204, to user 110.

The role of AR app 302 is typically embodied by a computing device or a network node hosting, i.e., executing, the AR software application. In particular, this may encompass evaluating and deciding on deployment of virtual objects, such as characters 104/204 in an AR game or information which is provided by an AR tourist guide, based on data pertaining to physical scene 100/200. The data pertaining to physical scene 100/200 is received 312 from user device 301, either as video data, e.g., the video sequence capturing physical scene 100/200, or as data describing the respective physical location and type of real-world, physical objects in physical scene 100/200. The data describing real-world objects may be determined by user device 301 based on image/video processing the video sequence capturing physical scene 100/200, by utilizing object recognition techniques.

When AR app 302 takes a decision to deploy 313 a virtual object 104/204, a request 314 for a physical location for placing virtual object 104/2043 is sent to location selector 303. The role of location selector 303 is implemented by embodiments of the invention, in particular the computing device for supporting an AR software application, and supports AR app 302 hosting the AR software application by selecting physical location 131/231 for placing virtual object 104/204 based on an expected physical location which user 110 assumes in response to displaying 123/223 physical scene 100/200 and overlaid current virtual object 104/204 to user 110, and the spatially-dependent attribute which has an impact on a user experience of the AR software application hosted by AR app 302.

In selecting a physical location for placing virtual object 104/204, location selector 303 sends a request 315 for values of the spatially-dependent attribute at the expected physical location of user 110 to attribute database 304, which responds by sending 316 the requested values to location selector 303. The role of attribute database 304 is typically implemented by a computing device or a network node maintaining values of the spatially-dependent attribute as a function of location. The database storing values of the spatially-dependent attribute may either be maintained by computing device 120, e.g., in a memory or data storage comprised in computing device 120, or by a separate device. For instance, the database may be maintained by an application server hosting the AR software application, or another network node associated with it. As a further example, the database may be maintained by a RAN node or an Operations Support Systems (OSS) node. For instance, a RAN node may maintain spatially-resolved information about the RAN's performance, such as data rate, error rate, signal strength, and the like. This information may either be collected from mobile terminals using the RAN, or simulated.

Based on the received 316 values for the spatially-dependent attribute, location selector 303 selects physical location 131/231 for placing virtual object 104/204, as is described herein. The selected physical location is sent 318 to AR app 302, which deploys 319 virtual object 104/204 by placing virtual object 104/204 at the selected physical location. Data describing the deployed virtual object is provided 320 to user device 301, which subsequently renders the view 123/223 displayed to user 110 by overlaying 321 virtual object 104/204 at the selected physical location onto physical scene 100/200. Alternatively, view 123/223 displayed to user 110 may be rendered by AR app 302 rather than user device 301. In this case, the data 320 describing the deployed virtual object is image/video data of the rendered augmented scene, which subsequently is displayed by user device 301.

It will be appreciated that embodiments of the invention may implement the different roles described hereinbefore either separately or in combination. For instance, HMD 120 may, in addition to implementing the role of user device 301, further implement any one or several of the roles of AR app 302, location selector 303, and attribute database 304. Alternatively, if HMD 120 only implements the role of user device 301, HMD 120 may interact, via a communications network and in particular a wireless connection, with an application server implementing the role of AR app 302, and optionally implementing the roles of location selector 303 and attribute database 304. An application server solely implementing the role of AR app 302 may, in turn, interact with a location server implementing the role of locations elector 303, and optionally implementing the role of attribute database 304. A location server solely implementing the role of location selector 303 may, in turn, interact with a network node implementing the role of attribute database 304.

Figure 5:
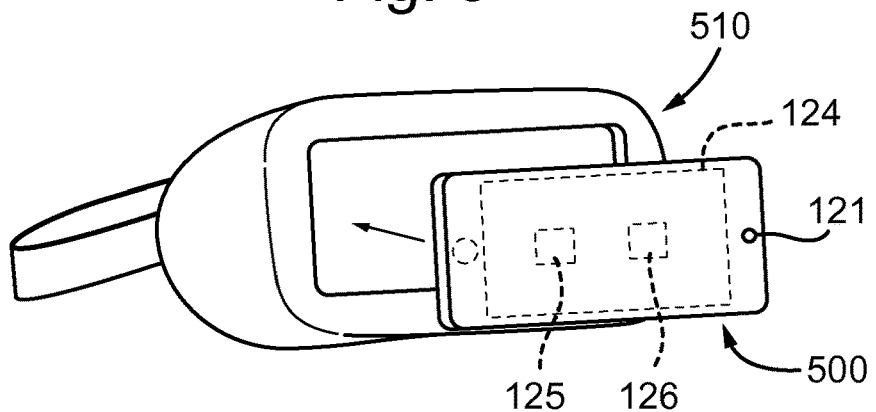
FIG. 5 shows a computing device for supporting an AR software application, in accordance with another embodiment of the invention.

Although embodiments of the invention have mainly been described with reference to computing device 120, which is illustrated as an HMD or a VR headset in FIGS. 1, 2, and 4, the computing device for supporting an AR software application may alternatively be embodied by other types of devices. For instance, the computing device may be embodied by a tablet, a mobile phone, a mobile terminal, a gaming console, or a smartphone 500, as is illustrated in FIG. 5. Similar to HMD 120, smartphone 500 comprises a camera 121, a display 124, processing means 125, and a communications module 126. Smartphone 500 may either by held by user 110 or paired to the forehead of user 110 using an adapter 510, similar to Google Cardboard or Samsung Gear VR.

Figure 6:
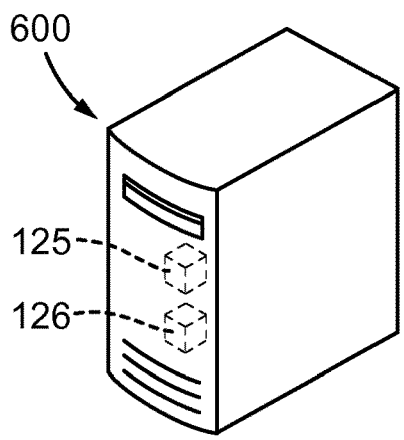
FIG. 6 shows a computing device for supporting an AR software application, in accordance with a further embodiment of the invention.

As a further alternative, with reference to FIG. 6, the computing device may be embodied as an application server 600 for hosting the AR software application, or as a location server 600 for supporting an AR software application in accordance with embodiments of the invention, implementing the role of AR app 302 or the role of location selector 303, respectively. Moreover, embodiments of the application/location server 600 may further implement the role(s) of user device 301 and/or the role of attribute database 304. Similar to HMD 120 and smartphone 500, application/location server 600 comprises processing means 125 and a communications module 126. As is illustrated in FIG. 6, application/location server 600 does not comprise a camera for capturing a physical scene in the surroundings of user 110, or a display for presenting the captured scene and overlaid virtual objects to user 110. Rather, this may be accomplished by an external camera and an external display, respectively. For instance, application server 600 hosting the AR software application may be in communication, preferably via a wireless connection, with a device worn by user 110 implementing the role of user device 301, and comprising a camera for capturing a physical scene in the surroundings of user 110 as well as a display for presenting the captured scene and overlaid virtual objects to user 110. The user-worn device may, e.g., be an HMD or a VR similar to what is shown in FIG. 4. As a further example, location server 600 may be in communication, preferably via a wireless connection, with the user-worn device which, in addition to implementing the role of user device 301 and comprising a camera for capturing a physical scene in the surroundings of user 110 and a display for presenting the captured scene and overlaid virtual objects to user 110, also implements the role of AR app 302 by hosting the AR software application.

To this end, in addition to selecting a physical location for placing a current virtual object, i.e., implementing the role of location selector 303, an embodiment of the computing device for supporting an AR software application may further be operative to host, i.e., execute, the AR software application, i.e., to implement the role of AR app 302. Alternatively, the AR software application may be executed by a separate device, such as an application server 600 implementing the role of AR app 302, which is in communication with the computing device for supporting an AR software application implementing the role of location selector 303.

An embodiment of the computing device for supporting an AR software application may further implement the role of user device 301 by overlaying a virtual object onto a video sequence capturing a physical scene in the surroundings of a user of the AR software application, such that the overlaid virtual object appears to be placed at the selected physical location. Preferably, the video sequence is captured by a camera worn by the user, such that a field-of-view of the camera is correlated with a physical location and orientation of the user, i.e., it moves with the user. The camera may optionally be comprised in the computing device, e.g., in a smartphone, HMD, or VR headset. Alternatively, an external camera may be connected to the computing device using a wired or wireless connection, in particular a camera worn by the user, such as a GoPro-type camera.

Moreover, an embodiment of the computing device for supporting an AR software application may further be operative to display the video sequence capturing the physical scene and the overlaid virtual object to the user, preferably using a display which is worn by the user. The display may, e. g., be integrated into the computing device, e.g., in a smartphone, HMD, or VR headset. Alternatively, the display may be paired to the forehead of the user so as to place images of both the physical world and virtual objects over the user's field of view.

In the following, embodiments of processing means 125, comprised in the computing device for supporting an AR software application, such as computing devices 120, 500, and 600, are described with reference to FIGS. 7 and 8.

Figure 7:
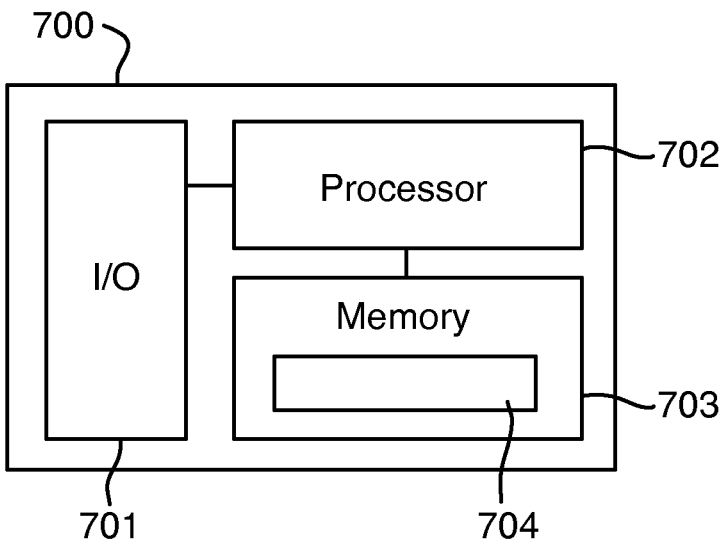
FIG. 7 shows an embodiment of the processing means comprised in the computing device for supporting an AR software application.

In FIG. 7, a first embodiment 700 of processing means 125 is shown. Processing means 700 comprises a processing unit 702, such as a general purpose processor, and a computer-readable storage medium 703, such as a Random Access Memory (RAM), a Flash memory, or the like. In addition, processing means 700 comprises one or more interfaces 701 ("I/O" in FIG. 7) for controlling and/or receiving information from other components comprised in computing device 120/500/600, such as camera 121, display 124, and communications module 126. Memory 703 contains computer-executable instructions 704, i.e., a computer program, for causing computing device 120/500/600 to perform in accordance with embodiments of the invention as described herein, when computer-executable instructions 704 are executed on processing unit 702. In particular, computing device 120/500/600 may be operative to select a physical location for placing a current virtual object based on an expected physical location which a user of the AR software application assumes in response to displaying the physical scene and the overlaid current virtual object to the user, and an attribute which is spatially dependent in the surroundings of the user and which has an impact on a user experience of the AR software application. For instance, the physical location for placing the current virtual object may be selected by determining, for at least one candidate physical location for placing the current virtual object, the expected physical location which the user assumes in response to displaying the physical scene and the current virtual object to the user, and evaluating a value of the spatially-dependent attribute at the expected physical location. The physical location for placing the current virtual object is then selected based on the plurality of values of the spatially-dependent attribute evaluated at the at least one candidate physical location. The expected physical location which the user assumes in response to displaying the physical scene and the overlaid current virtual object to the user may, e.g., be within a predetermined range of, or equal to, the candidate physical location.

Optionally, the expected physical location which the user assumes in response to displaying the physical scene and the overlaid current virtual object to the user may be determined based on a type of the current virtual object. For instance, the expected physical location may be determined based on information pertaining to expected behavior of users of the AR software application in response to displaying a virtual object of the same type as the current virtual object to the users. Alternatively, the expected physical location may be determined based on a learned behavior of the user in response to previously displayed virtual objects of the same type as the current virtual object.

The spatially-dependent attribute may be related to a performance of a wireless connection utilized by the AR software application. For instance, the spatially-dependent attribute may be any one of a signal strength, a data rate, a bandwidth, an error rate, a retransmission rate, and a latency, of the wireless connection. Alternatively, the spatially-dependent attribute may be related to a perception by the user of sound which is rendered by the AR software application.

Figure 8:
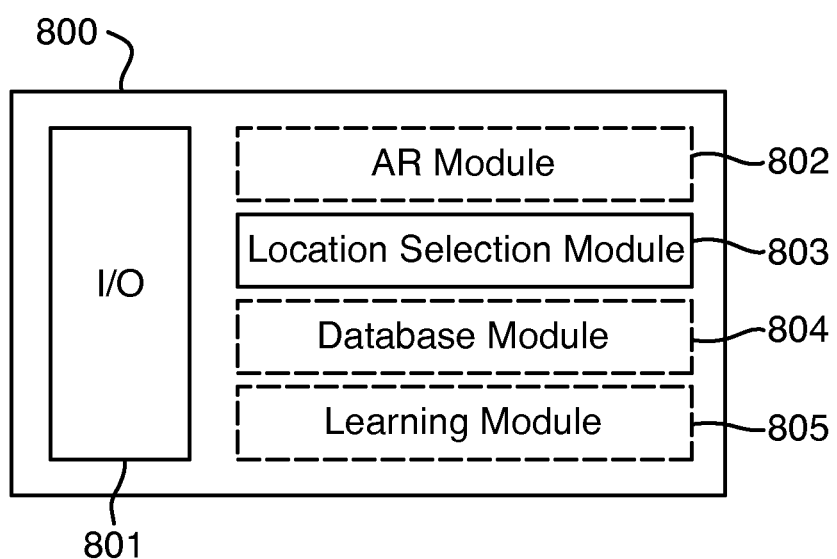
FIG. 8 shows another embodiment of the processing means comprised in the computing device for supporting an AR software application.

In FIG. 8 an alternative embodiment 800 of processing means 125 is illustrated. Similar to processing means 700, processing means 800 comprises one or more interfaces 801 ("I/O" in FIG. 8) for controlling and/or receiving information from other components comprised in computing device 120/500/600, such as camera 121, display 124, and communications module 126. Processing means 800 further comprises a location selection module 803 which is configured for causing computing device 120/500/600 to perform in accordance with embodiments of the invention as described herein. In particular, location selection module 803 is configured for selecting a physical location for placing a current virtual object based on an expected physical location which a user of the AR software application assumes in response to displaying the physical scene and the overlaid current virtual object to the user, and an attribute which is spatially dependent in the surroundings of the user and which has an impact on a user experience of the AR software application. For instance, the physical location for placing the current virtual object may be selected by determining, for at least one candidate physical location for placing the current virtual object, the expected physical location which the user assumes in response to displaying the physical scene and the current virtual object to the user, and evaluating a value of the spatially-dependent attribute at the expected physical location. The physical location for placing the current virtual object is then selected based on the plurality of values of the spatially-dependent attribute evaluated at the at least one candidate physical location. The expected physical location which the user assumes in response to displaying the physical scene and the overlaid current virtual object to the user may, e.g., be within a predetermined range of, or equal to, the candidate physical location.

Processing means 800 may optionally comprise an AR module 802 which is configured for hosting, i.e., executing, the AR software application.

Optionally, the expected physical location which the user assumes in response to displaying the physical scene and the overlaid current virtual object to the user may be determined based on a type of the current virtual object. For instance, the expected physical location may be determined based on information pertaining to expected behavior of users of the AR software application in response to displaying a virtual object of the same type as the current virtual object to the users. This information may, e.g., be provided by AR module 802 or retrieved from an application sever hosting the AR software application. Alternatively, the expected physical location may be determined, by an optional learning module 805 comprised in processing means 800, based on a learned behavior of the user in response to previously displayed virtual objects of the same type as the current virtual object.

The spatially-dependent attribute may be related to a performance of a wireless connection utilized by the AR software application. For instance, the spatially-dependent attribute may be any one of a signal strength, a data rate, a bandwidth, an error rate, a retransmission rate, and a latency, of the wireless connection. Alternatively, the spatially-dependent attribute may be related to a perception by the user of sound which is rendered by the AR software application. Processing means 800 may optionally comprise a database module 804 which is configured for maintaining a database from which one or more values of the spatially-dependent attribute may be retrieved as a function of a physical location in the surroundings of the user. Further optionally, values of the spatially-dependent attribute measured by computing device 120/500/600 may be stored by database module 804 in the database as a function of physical location.

Interface(s) 701 and 801, and modules 802-805, as well as any additional modules comprised in processing means 800, may be implemented by any kind of electronic circuitry, e.g., any one, or a combination of, analogue electronic circuitry, digital electronic circuitry, and processing means executing a suitable computer program.

Communications module 126 comprised in computing device 120/500/600 may, e.g., be a Bluetooth module, a WLAN/Wi-Fi module, or a cellular communications module supporting any one, or a combination of, GMS, UMTS, LTE, and a 5G standard. Alternatively, communications module 126 may be configured for effecting communications by means of Infrared (IR) light, Visible Coded Light (VCL), ZigBee, and so forth.

Figure 9:
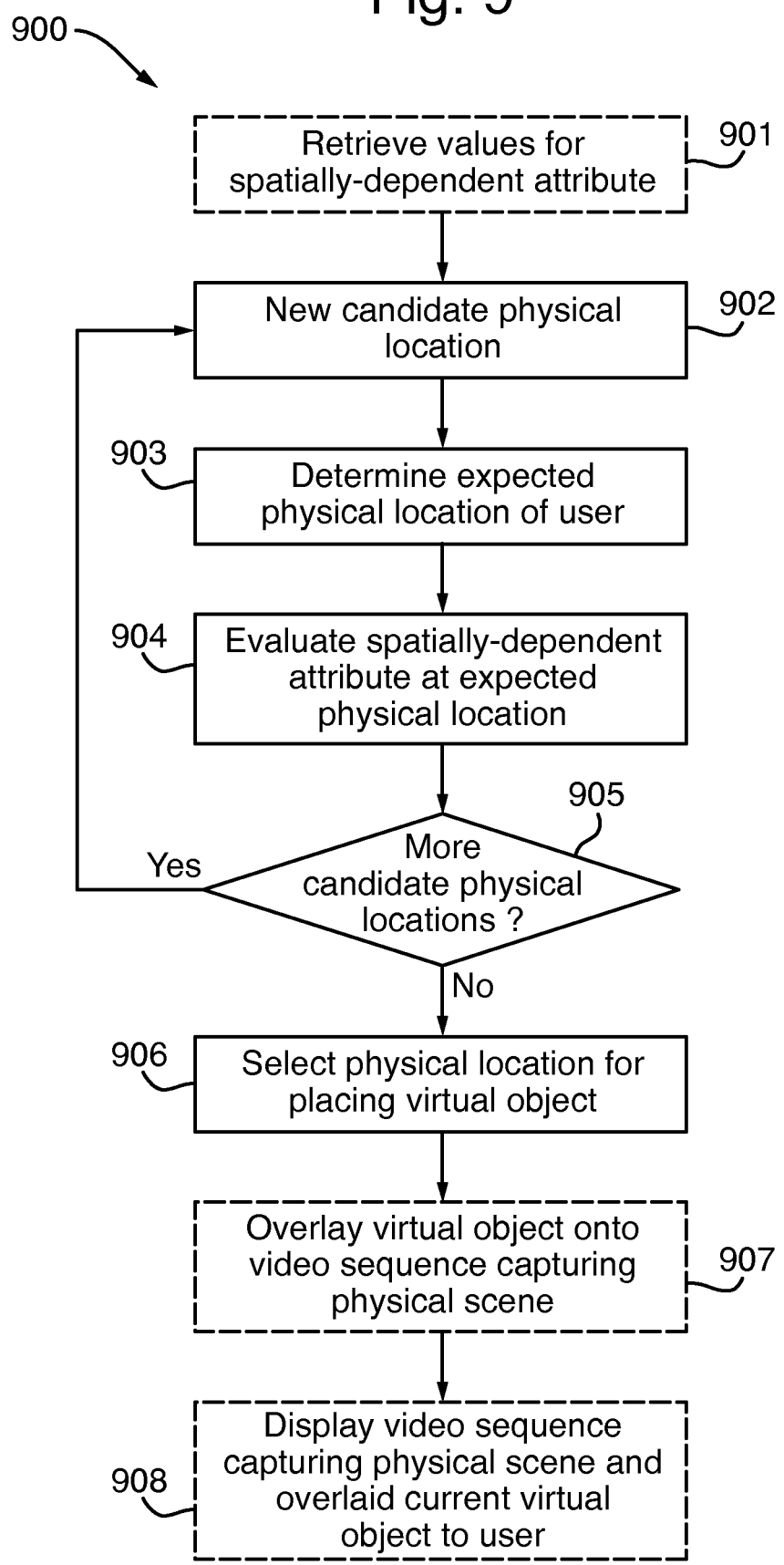
FIG. 9 shows a method of supporting an AR software application, in accordance with embodiments of the invention.

In the following, embodiments 900 of the method of supporting an AR software application are described with reference to FIG. 9. Method 900 may be performed by a computing device such as a gaming server hosting the AR software application, a location server for supporting the AR software application, a VR headset or an HMD, a mobile phone, a smartphone, a mobile terminal, a personal computer, a laptop, a tablet, and a gaming console. Method 900 comprises selecting 906 a physical location for placing a current virtual object based on an expected physical location which the user assumes in response to displaying the physical scene and the overlaid current virtual object to the user, and an attribute which is spatially dependent in the surroundings of the user and which has an impact on a user experience of the AR software application. The selected physical location is the physical location where the current virtual object appears to be placed when overlaid onto a video sequence capturing a physical scene in the surroundings of a user of the AR software application.

The physical location for placing the current virtual object may be selected 906 by determining 903, for at least one candidate physical location for placing the current virtual object (by selecting or creating 902 a new candidate physical location in response to determining 905 that more candidate physical locations need to be evaluated), the expected physical location which the user assumes in response to displaying the physical scene and the current virtual object to the user, overlaid such that it appears to be placed at the candidate physical location, and evaluating 904 a value of the spatially-dependent attribute at the expected physical location. The physical location for placing the current virtual object is then selected 906 based on the plurality of values of the spatially-dependent attribute evaluated 904 at the at least one candidate physical location. The set of candidate physical locations is may, e.g., be received from the AR software application. Alternatively, a new candidate physical locations may be created 902 based on information provided by the AR software application, as is described hereinbefore.

The expected physical location which the user assumes in response to displaying the physical scene and the overlaid current virtual object to the user may, e.g., be determined 903 to be within a predetermined range of, or equal to, the candidate physical location. Optionally, the expected physical location which the user assumes in response to displaying the physical scene and the overlaid current virtual object to the user may be determined 903 based on a type of the current virtual object. For instance, the expected physical location may be determined 903 based on information pertaining to expected behavior of users of the AR software application in response to displaying a virtual object of the same type as the current virtual object to the users. Alternatively, the expected physical location may be determined 903 based on a learned behavior of the user in response to previously displayed virtual objects of the same type as the current virtual object.

Method 900 may further comprise retrieving, from a database, one or more values of the spatially-dependent attribute as a function of a physical location in the surroundings of the user. These values may, e.g., either be retrieved when evaluating 904 the spatially-dependent attribute at the determined 903 expected physical location of the user. Alternatively, a list or an array of values, or a map representing the spatially-dependent attribute in a certain geographical region, may be retrieved 901.

Method 900 may further comprise 907 overlaying the current virtual object onto the video sequence capturing the physical scene, such that the overlaid current virtual object appears to be placed at the selected physical location.

Method 900 may further comprise displaying 908 the video sequence capturing the physical scene and the overlaid current virtual object to the user.

It will be appreciated that method 900 may comprise additional, or modified, steps in accordance with what is described throughout this disclosure. An embodiment of method 900 may be implemented as software, such as computer program 704, to be executed by a processing unit comprised in the computing device for supporting an AR software application, whereby the computing device is operative to perform in accordance with embodiments of the invention described herein.

The person skilled in the art realizes that the invention by no means is limited to the embodiments described above. On the contrary, many modifications and variations are possible within the scope of the appended claims.

The invention claimed is:

1. A computing device for supporting an Augmented-Reality (AR) software application, the computing device comprising a processing circuitry being operative to perform operations comprising:
    evaluating and providing a plurality of candidate physical object locations each for placing a current virtual object when the current virtual object is overlaid onto a video sequence capturing a physical scene in surroundings of a user of the AR software application, wherein each candidate physical object location is evaluated based on:
        an expected physical user location, wherein the computing device displaying the physical scene and the overlaid current virtual object at the candidate physical object location to the user triggers the user to either move to or remain at the expected physical user location; and
        an attribute which is spatially dependent in the surroundings of the user and which has an impact on a user experience of the AR software application, wherein the spatially-dependent attribute is related to a performance of a wireless connection utilized by the AR software application, wherein the spatially-dependent attribute is represented by a map which covers the surroundings of the user;
    selecting a physical object location from the plurality of candidate physical object locations; and
    placing the current virtual object at the selected physical object location, wherein the number of evaluated and provided candidate physical object locations is smaller when the spatially-dependent attribute related to the performance of the wireless connection used by the AR software application is relatively constant, compared to when the spatially-dependent attribute changes more rapidly.

2. The computing device according to claim 1, the processing circuitry being operative to select the physical location for placing the current virtual object by: for at least one candidate physical location for placing the current virtual object:
    determining the expected physical location which the user assumes in response to displaying the physical scene and the current virtual object, overlaid such that it appears to be placed at the candidate physical location, to the user, and
    evaluating a value of the spatially-dependent attribute at the expected physical location, and
    selecting the physical location for placing the current virtual object based on the plurality of values of the spatially-dependent attribute evaluated at the at least one candidate physical location.

3. The computing device according to claim 2, wherein the expected physical location which the user assumes in response to displaying the physical scene and the overlaid current virtual object to the user is within a predetermined range of the candidate physical location.

4. The computing device according to claim 2, wherein the expected physical location which the user assumes in response to displaying the physical scene and the overlaid current virtual object to the user is determined based on a type of the current virtual object.

5. The computing device according to claim 4, wherein the expected physical location which the user assumes in response to displaying the physical scene and the overlaid current virtual object to the user is determined based on information pertaining to expected behavior of users of the AR software application in response to displaying a virtual object of the same type as the current virtual object to the users.

6. The computing device according to claim 4, wherein the expected physical location which the user assumes in response to displaying the physical scene and the overlaid current virtual object to the user is determined based on a learned behavior of the user in response to previously displayed virtual objects of the same type as the current virtual object.

7. The computing device according to claim 1, being further operative to retrieve, from a database, one or more values of the spatially-dependent attribute as a function of a physical location in the surroundings of the user.

8. The computing device according to claim 1, the processing circuitry being further operative to store, in a database, measured values of the spatially-dependent attribute as a function of physical location.

9. The computing device according to claim 7, wherein the database is maintained by any one of: the computing device, a Radio Access Network (RAN) node, and an Operations Support Systems (OSS) node.

10. The computing device according to claim 1, wherein the spatially-dependent attribute comprises at least one of a data rate, a bandwidth, an error rate, and a retransmission rate of the wireless connection.

11. The computing device according to claim 1, wherein the spatially-dependent attribute is further related to a perception by the user of sound which is rendered by the AR software application, and wherein the processing circuitry is further operative to select the physical location for placing the current virtual object further based on avoiding from deploying the current virtual object at physical locations at which sound perceived by the user is less than a predetermined quality or a predetermined volume.

12. The computing device according to claim 1, the processing circuitry being further operative to overlay the current virtual object onto the video sequence capturing the physical scene, such that the overlaid current virtual object appears to be placed at the selected physical location.

13. The computing device according to claim 12, the processing circuitry being further operative to display the video sequence capturing the physical scene and the overlaid current virtual object to the user.

14. The computing device according to claim 1, wherein the video sequence is captured by a camera worn by the user, such that a field-of-view of the camera is correlated with a physical location and orientation of the user.

15. The computing device according to claim 1, wherein the display is worn by the user.

16. The computing device according to claim 1, being any one of: a gaming server hosting the AR software application, a virtual-reality headset, a head-mounted display, a mobile phone, a smartphone, a mobile terminal, a personal computer, a laptop, a tablet, and a gaming console.

17. A method of supporting an Augmented-Reality (AR) software application, the method comprising:
    evaluating and providing, performed by a computing device, a plurality of candidate physical object locations each for placing a current virtual object when the current virtual object is overlaid onto a video sequence capturing a physical scene in surroundings of a user of the AR software application, wherein each candidate physical object location is evaluated based on:
        an expected physical user location, wherein the computing device displaying the physical scene and the overlaid current virtual object at the candidate physical object location to the user triggers the user to either move to or remain at the expected physical user location; and
        an attribute which is spatially dependent in the surroundings of the user and which has an impact on a user experience of the AR software application, wherein the spatially-dependent attribute is related to a performance of a wireless connection utilized by the AR software application, wherein the spatially-dependent attribute is represented by a map which covers the surroundings of the user; and
    selecting, performed by the computing device, a physical object location from the plurality of candidate physical object locations; and
    placing, performed by the computing device, the current virtual object at the selected physical object location, wherein the number of evaluated and provided candidate physical object locations is smaller when the spatially-dependent attribute related to the performance of the wireless connection used by the AR software application is relatively constant, compared to when the spatially-dependent attribute changes more rapidly.

18. The method according to claim 17, wherein the spatially-dependent attribute comprises at least one of a data rate, a bandwidth, an error rate, and a retransmission rate of the wireless connection.

19. The method according to claim 17, wherein the spatially-dependent attribute is further related to a perception by the user of sound which is rendered by the AR software application, and wherein selecting the physical location for placing the current virtual object is further based on avoiding from deploying the current virtual object at physical locations at which sound perceived by the user is less than a predetermined quality or a predetermined volume.

20. A computer program product comprising a non-transitory computer-readable storage medium, the computer-readable storage medium having embodied therein computer-executable instructions for causing a device to perform a method of supporting an Augmented-Reality (AR) software application, the method comprising:
    evaluating and providing, performed by a computing device, a plurality of candidate physical object locations each for placing a current virtual object when the current virtual object is overlaid onto a video sequence capturing a physical scene in surroundings of a user of the AR software application, wherein each candidate physical object location is evaluated based on:
        an expected physical user location, wherein the device displaying the physical scene and the overlaid current virtual object at the candidate physical object location to the user triggers the user to either move to or remain at the expected physical user location; and
        an attribute which is spatially dependent in the surroundings of the user and which has an impact on a user experience of the AR software application, wherein the spatially-dependent attribute is related to a performance of a wireless connection utilized by the AR software application, wherein the spatially-dependent attribute is represented by a map which covers the surroundings of the user; and
    selecting, performed by the computing device, a physical object location from the plurality of candidate physical object locations; and
    placing, performed by the computing device, the current virtual object at the selected physical object location, wherein the number of evaluated and provided candidate physical object locations is smaller when the spatially-dependent attribute related to the performance of the wireless connection used by the AR software application is relatively constant, compared to when the spatially-dependent attribute changes more rapidly.

21. The computer program product according to claim 20, wherein the spatially-dependent attribute comprises at least one of a data rate, a bandwidth, an error rate, and a retransmission rate of the wireless connection.

22. The computer program product according to claim 20, wherein the spatially-dependent attribute is further related to a perception by the user of sound which is rendered by the AR software application, and wherein selecting the physical location for placing the current virtual object is further based on avoiding from deploying the current virtual object at physical locations at which sound perceived by the user is less than a predetermined quality or a predetermined volume.

* * * * *